United States Patent

Agrawal et al.

[11] Patent Number: 5,832,475
[45] Date of Patent: Nov. 3, 1998

[54] DATABASE SYSTEM AND METHOD EMPLOYING DATA CUBE OPERATOR FOR GROUP-BY OPERATIONS

[75] Inventors: Rakesh Agrawal, San Jose; Ashish Gupta, Menlo Park; Sunita Sarawagi, Berkeley, all of Calif.

[73] Assignee: International Business Machines Corporation, Armonk, N.Y.

[21] Appl. No.: 624,283

[22] Filed: Mar. 29, 1996

[51] Int. Cl.$^6$ .................................................. G06F 17/30
[52] U.S. Cl. ........................ 707/2; 707/7; 707/1; 707/3; 707/4
[58] Field of Search .................. 385/602, 607; 382/49; 707/1, 2, 3, 4

[56] References Cited

U.S. PATENT DOCUMENTS

| | | | |
|---|---|---|---|
| 5,280,547 | 1/1994 | Mahoney | 382/49 |
| 5,412,804 | 5/1995 | Krishma | 707/2 |
| 5,497,486 | 3/1996 | Stoffo et al. | 707/5 |
| 5,537,589 | 7/1996 | Dalal | 395/602 |
| 5,542,073 | 7/1996 | Schiefer et al. | 395/602 |
| 5,548,755 | 8/1996 | Leung et al. | 395/602 |
| 5,598,559 | 1/1997 | Chaudhuri | 395/602 |
| 5,613,109 | 3/1997 | Yamauchi et al. | 707/104 |
| 5,642,502 | 6/1997 | Driscoll | 707/5 |
| 5,717,915 | 2/1998 | Stoffo et al. | 707/5 |

OTHER PUBLICATIONS

M. R. Garey and D. S. Johnson, Computers & Intractability, Chapter Appendix, pp. 208–209.

P. J. Haas, J. F. Naughton, S. Seshadri, and L. Stokes, Sampling–based Estimation of the Number of Distinct Values of an Attribute, In Proceedings of the 21st International Conference on Very Large Databases (VLDB), pp. 311–322, Zurich, Switzerland, Sep. 1995.

J. MacGregor, Smith, Judith S. Liebman, An O (n2) Heuristic Algorithm for the Directed Steiner Minimal Tree Problem, Appl. Math, Modelling, pp. 369–375, vol. 4, Oct. 1980.

J. Gray, A. Bosworth, A. Layman, & H. Pirahesh, Data Cube: A Relational Aggregation Operator Generalizing Group–by, Cross–tabs and Sub–totals. Technical Report MSR–TR–95–22, Microsoft Research, Advance Technology Division, Microsoft Corporation, Redmond, Washington, Nov. 1995.

(List continued on next page.)

*Primary Examiner*—Thomas G. Black
*Assistant Examiner*—Frantz Coby
*Attorney, Agent, or Firm*—James C. Pintner

[57] ABSTRACT

Disclosed is a system and method for performing database queries including GROUP-BY operations, in which aggregate values for attributes are desired for distinct, partitioned subsets of tuples satisfying a query. A special case of the aggregation problem is addressed, employing a structure, called the data cube operator, which provides information useful for expediting execution of GROUP-BY operations in queries. Algorithms are provided for constructing the data cube by efficiently computing a collection of GROUP-BYs on the attributes of the relation. Decision support systems often require computation of multiple GROUP-BY operations on a given set of attributes, the GROUP-BYs being related in the sense that their attributes are subsets or supersets of each other. The invention extends hash-based and sort-based grouping methods with optimizations, including combining common operations across multiple GROUP-BYs and using pre-computed GROUP-BYs for computing other GROUP-BYs. An extension of the cube algorithms handles any given collection of aggregates.

69 Claims, 13 Drawing Sheets

OTHER PUBLICATIONS

Goetz Graefe, Ann Linville, & Leonard D. Shapiro, Sort Versus Hash Revisited, IEEE Transactions on Knowledge and Data Engineering, vol. 6, No. 6, pp. 934–943, Dec. 1994.

X. Lin and L.M. Ni, Multicast Communication in Multicomputer Networks, In Proc. International Conference on Parallel Processing, pp. III–114–118, 1990.

Goetz Graefe, Query Evaluation Techniques for Large Databases, ACM Computing Surveys, 25 (2):73–170, Jun. 1993.

E. F. Codd, s. B. Codd, C. T. Salley, Providing OLAP (On–line Analytical Processing to User–Analysts: An IT Mandate, E. F. Codd & Associates.

C. H. Papadimitriou and K. Steiglitz, Combinatorial Optimization: Algorthms and Complexity, Chapter 11, pp. 247–254, 1982.

Gray et al, Data Cube: A Relational Aggregation Operator Generalizing Group–By, Cross–Tab, and Sub–Totals, Nov. 1995.

Aggregate

Sum

Group By (with total)

By Color
RED
WHITE
BLUE

Sum

Cross Tab

Chevy Ford   By Color
RED
WHITE
BLUE
By Make

Sum

The Data Cube and The Sub-Space Aggregates

DATABASE SYSTEM AND METHOD EMPLOYING DATA CUBE OPERATOR FOR GROUP-BY OPERATIONS

FIELD OF THE INVENTION

The invention generally relates to the field of relational database management systems. More particularly, the invention relates to the extraction, or "mining", of data from a database, such that the mined data provides information useful to a user of the system.

BACKGROUND OF THE INVENTION

When a user of a relational database system runs a query, the results of the query commonly include a set of tuples, each tuple including a set of values for attributes. The user will likely have a particular interest in one or more of the attributes. As a consequence, database systems have had the capacity to sort the tuples in the query report based on one or more of the attributes, in order to report the tuples in an order which comports with the importance the user places on the values of one or more of the attributes. In a broader sense, the sort of information the user is seeking may pertain to the values of those attributes which are the subject of the user's particular interest. Therefore, database systems have provided functionality such as the GROUP-BY command for allowing users to receive desired query reports.

A GROUP-BY operation partitions a relation into disjoint tuple sets, and then aggregates separately over each set. Thus, the number of aggregations produced by a GROUP-BY operation depends on the number of disjoint tuple sets, which in turn depends on the number of attribute arguments of the GROUP-BY operation.

In a particular class of database systems, called On-Line Analytical Processing (OLAP) database systems, the objective is to summarize data at various levels of detail, and on various combinations of attributes of a relation. Thus, instead of merely reporting the tuples which satisfy a given query, an information processing function can also be used to provide the user with still more of the sort of information desired. Such conventional systems are described in Codd et al., "Beyond decision support", Computerworld, 27(30), July 1993.

For instance, consider a common OLAP table, called "Transactions", which makes up a relation having four attributes called product(P), date(D), market(M), and sales (S), and which records the sales value of a company's products on various dates for various markets and various products. The objective is to find the sum of sales(s) for all permutations of the other three attributes, i.e., to find the sum of sales for each product, for each market, for each date, for each product-market combination, for each market-date combination, and so on.

A GROUP-BY operation, executed over this relation, produces results that give the fractional portions of the entire sales volume for all possible permutations of each desired combination of attributes. For instance, if the total sales by date is all that is desired, then a GROUP-BY operation based on the date is run. The result is a set of sums, one sum for each date, of the sales volumes of all products at all locations.

Multiple GROUP-BY operations are often desired, to produce a more detailed breakdown of the information. For instance, if sales by date and also sales of each product by date are desired, then two GROUP-BY operations are executed. The first GROUP-BY produces a total sales figure for each date, as before. The second GROUP-BY produces a number of sums of sales figures equal to the product of the number of days covered and the number of different products. For this latter GROUP-BY, each separate sum represents the sales of a given product on a given date.

It will be seen, then, that the most detailed breakdown that can be given for the above scenario is for sales values based on all permutations of the other three attributes. These sales sums can be found by making a query including eight GROUP-BY operations, based on various permutations of the three attributes. That is, sales sums can be calculated as follows:

PDM (one GROUP-BY)—a separate sum for each combination of distinct product, date, and market values;

PD, PM, DM (three GROUP-BYs)—a separate sum for each combination of distinct values of two of the three attributes, regardless of the value of the third attribute;

D, M, P (three GROUP-BYs)—a separate sum for each distinct value of any one of the three attributes, regardless of the value of the other two attributes; and all (one GROUP-BY)—a single sum for all combinations of values of all three of the attributes. This is the trivial case which produces a total sum of all sales, without breaking the sales down over any of the other attributes.

A query against this relation can include some or all of these possible GROUP-BYs. Thus, how efficiently the GROUP-BYs are calculated is a significant consideration. The straightforward "brute force" way to extend a database system to support a query including these GROUP-BYs is to rewrite the query as a set of eight distinct GROUP-BY queries, and execute the eight queries separately. Conventional database systems have executed queries having multiple GROUP-BYs in this brute force fashion.

However, the challenge at hand is to find ways of obtaining the same desired information more efficiently than this brute force technique.

SUMMARY OF THE INVENTION

It is therefore an object of the invention to execute GROUP-BY commands, such as those discussed above, with improved efficiency.

To achieve these and other objects, there is provided in accordance with the invention a method, for execution by a database system, for performing GROUP-BY operations on a relation given in terms of a set of attributes.

Broadly stated, the method includes the following steps: an operator is generated by the system, based on the data stored in the relation. In accordance with the invention, the operator is generated using various optimization techniques. A first GROUP-BY operation is computed on a first subset of the set of attributes, using the operator. Then, a second GROUP-BY operation is computed on a second subset of the set of attributes. The second subset is a proper subset of the first subset. The second GROUP-BY is computed based on the results of the step of computing the first GROUP-BY operation on the first subset of the attributes. Execution of a query then employs the operator to obtain the requested aggregate information.

This broad statement of the invention will be elaborated upon by means of descriptions of several particular ways of performing this basic method in ways which optimizes performance. In general, the method of the invention is practiced by means of computations of an operator called a data cube, using particular novel optimizations to be discussed in detail, followed by use of the data cube for execution of multiple GROUP-BY operations on a set of attributes.

The data cube operator has been recently introduced in Gray et al., "Data cube: a relational operator generalizing group-by, cross-tabs, and sub-totals", Technical Report MSR-TR-95-22, Microsoft Research, Advanced Technology Division, Microsoft Corp., Redmond, Wash, November 1995.

The data cube is an operator for conveniently supporting the aggregation (GROUP-BY) function in decision support database systems, such as OLAP systems. A data cube operator is an N-dimensional generalization of aggregate functions. Such an operator generally summarizes the different possible GROUP-BYs. Because the total number of possible GROUP-BYs is generally 2 raised to the power of the number of attributes, and because of the relationships between GROUP-BYs which have attributes in common, the name "data cube" is not only metaphorically appropriate, but also provides a geometric sense in which the GROUP-BYs may be visualized. Such an operator is also of practical value as a reference, utilized by the system for identifying GROUP-BYs to perform.

In accordance with the invention, three optimizations are provided for combining multiple GROUP-BYs to efficiently compute a data cube. The three optimizations are named "smallest-parent", "cache-results", and amortize-scans", and are described in detail below.

Two other optimizations, more specific to particular algorithms used for generating the data cube, are also given, (I) sharing sorting cost across multiple GROUP-BYs that applies to sort-based algorithms, and (ii) sharing the partitioning cost across multiple GROUP-BYs that applies to hash-based algorithms for computing the data cube.

A noteworthy aspect of the invention is in putting together these (often contradictory) optimizations into a single algorithmic framework. The resultant algorithms exhibit dramatic performance improvement over straightforward algorithms that compute each GROUP-BY separately.

Another noteworthy aspect of the invention is the extension of the cube algorithms for the case where only a specified subset of the GROUP-BYs in a cube need to be computed. A reduction of the problem to the minimum Steiner tree problem is identified. This makes it possible to find plans that consider extra computation of intermediate GROUP-BYs that are not part of the specified subset, but can lead to smaller total cost.

Yet another aspect of the invention is the handling of aggregation hierarchies associated with attributes. Extensions to the cube algorithms are given for this common OLAP case.

In summary, the invention, in its various embodiments and implementations, provides advantageously increased efficiency in execution of queries which require GROUP-BYs on a common set of attributes.

DESCRIPTION OF THE PREFERRED EMBODIMENT

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

Overview of the Data Cube Operator

As stated above, a data cube operator is an N-dimensional generalization of simple aggregate functions. Thus, a data cube is a data structure which is stored in memory, but which has the characteristics of N-dimensionality.

Figure 1:
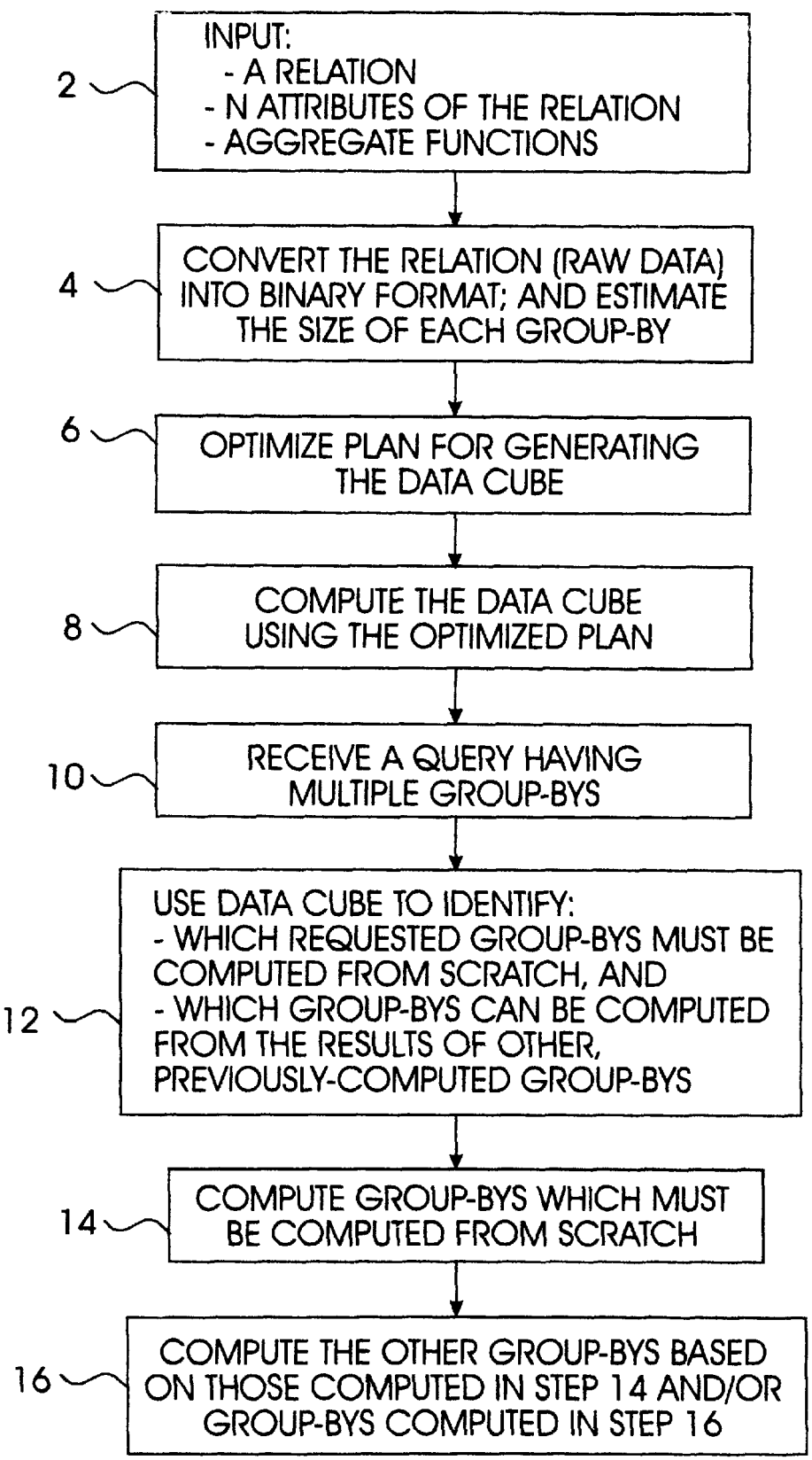
FIG. 1 is a high-level block diagram showing, in essence, the method of the invention.
Figure 1A:
FIG. 1(a) is a visualization, in perspective, of data cube operators for various dimensions, i.e., for various numbers of attributes in the relation.
Figure 1A:
Figure 1A:
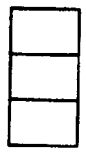
Figure 1A:
Figure 1A:
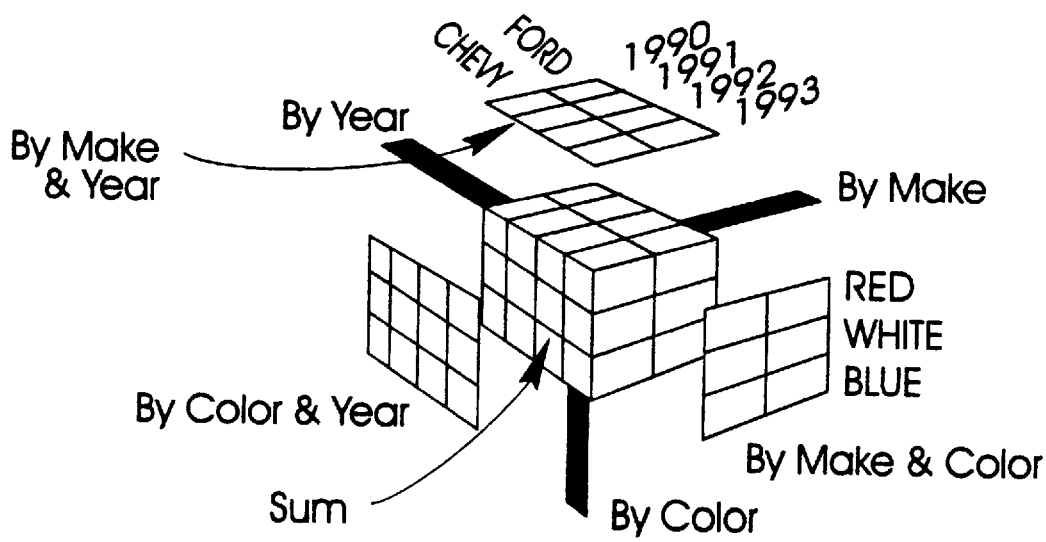
Figure 2:
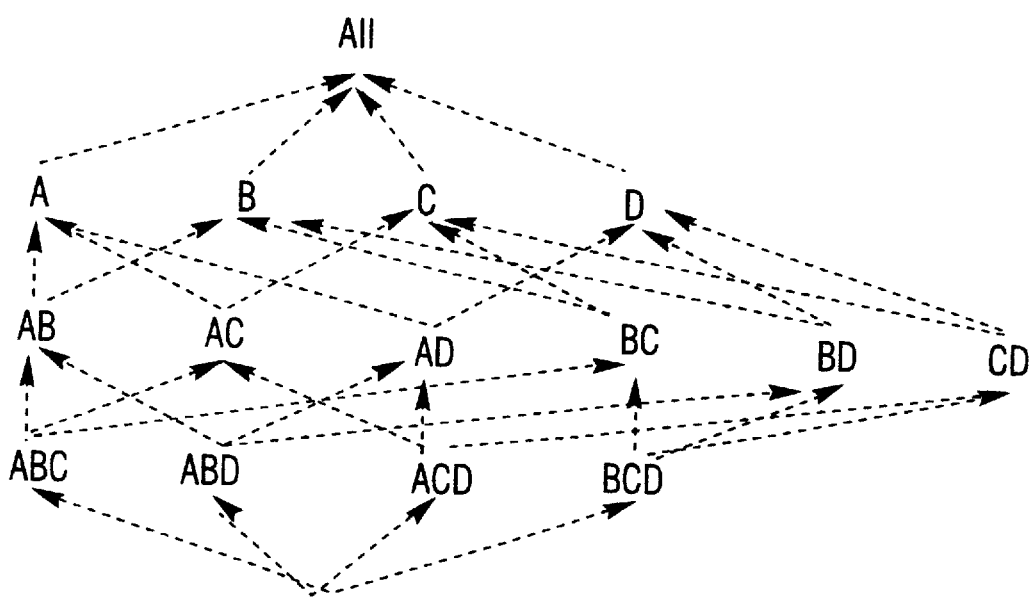
FIG. 2 is a graphical representation of a data cube operator in accordance with the invention.

FIG. 1(a), which is a reproduction of FIG. 2 of the Gray et al. paper, illustrates, on a conceptual geometric level, the information provided by data cube operators for different dimensions. The example given is for automobile sales, the attributes being color (red, white, blue), make (Chevy, Ford), and year (1990, 1991, 1992, 1993)

A 0-dimensional data cube operator is a single total sum value, which may be visualized as a single point.

A 1-dimensional data cube operator, for the single attribute of color, is a one-dimensional vector of values for the color attribute, plus a total sum. This may be visualized as a line, or linear sequence of values, plus a point for the total sum.

A 2-dimensional data cube operator, for the two attributes color and make, is a cross tabulation, which includes a two-dimensional array of all possible combinations for make and color, two one-dimensional vectors of total sales for each color and total sales for each make, and a total sum. Geometrically, this may be visualized as a plane, two lines, and a point.

A 3-dimensional data cube operator, for the three attributes color, make, and year, includes a three-dimensional array of all possible combinations for color, make, and year, and three intersecting two-dimensional cross tabulations. Each cross tabulation includes a two-dimensional array for two of the three attributes. Each two of the cross tabulations intersect as a one-dimensional vector for the attribute the two cross tabulations have in common. Finally, all three cross tabulations intersect for the total sum. Thus, a three-dimensional data cube operator may be visualized geometrically as a volume, three planes, three lines, and a point.

Overview of the Invention

FIG. 1 is a flowchart which summarizes the basic steps of the method of the invention, and also shows the role the invention plays in the overall process of responding to a query calling for GROUP-BY operations on attributes of a dataset.

The flowchart of FIG. 1 describes the initial input of a relation and its attributes (step 2), the generation of the data cube operator based on the input information (steps 4, 6, and 8), and activities executed in response to a query which make use of the data cube operator (steps 10, 12, 14, and 16). The combination of these activities is a novel, non-obvious, and advantageously efficient computation of a query.

First information is input (step 2). This information includes an overall relation, a set of attributes of the relation, and aggregate functions characterized by combinations of the attributes. This step is typically carried out in the course of entering data into a database.

Given this information, in accordance with the invention a data cube is generated. Step 4 describes initial processing which is performed as needed. The relation, if provided as raw data in step 2, is converted into a suitable format, preferably binary. The size of each GROUP-BY, which is utilized as described below, is generated.

The plan for generating the data cube is optimized (step 6), in ways which will be discussed in detail below. Finally, the data cube is optimized using the optimized plan (step 8).

The system is now prepared to process a query in an advantageously efficient manner. When a query, requiring multiple GROUP-BYs over a set of attributes, is received (step 10), execution of the query proceeds.

First, a determination is made as to which GROUP-BYs can be computed from the results of other GROUP-BYs, and which GROUP-BYs must be computed from scratch (step 12). The latter GROUP-BYs are executed (step 14). Then, the results of those GROUP-BYs are used in the execution of other GROUP-BYs (step 16. Thus, many, if not most, of the GROUP-BYs are executed, utilizing the results of previously executed GROUP-BYs, to further improve performance of the overall query.

By utilizing the data cube operator, the query is efficiently processed by executing a first GROUP-BY (step 14) over a first subset of the attributes to produce a first result, and then executing a second GROUP-BY (step 16) over a second subset of attributes (which is a proper subset of the first subset of attributes) using the results of the first GROUP-BY.

Execution of a simple query, having only two GROUP-BY operations, one being a proper subset of the other, is the simplest form of execution of a query according to the invention. However, the invention also provides for a more elaborate treatment of situations in which more than two GROUP-BYs are to be computed, and several of the GROUP-BYs may be computed based on the results of previously computed GROUP-BYs.

It will be understood that the first subset can include the entire set of attributes which is the subject of the query. Also, a query requiring a large number of GROUP-BYs over a large set of attributes can be executed, using an overall strategy in accordance with the invention.

It will be understood that query execution according to the invention can alternatively be implemented in a manner in which step 14 is executed for fewer than all of the relevant GROUP-BYs, step 16 then computes those GROUP-BYs which depend on the results of the GROUP-BYs just computed by step 16, and then program control returns to step 14, for the execution from scratch of further GROUP-BYs, whose results are then used in another execution of step 16, and so forth.

In accordance with the invention, efficient methods are provided for computing multiple aggregates, i.e., multiple GROUP-BYs, on a given set of attributes. The main focus is on computation of the cube operator, discussed above, to facilitate computation of the multiple GROUP-BYs as the query is being executed.

The cube-operator algorithms according to the invention are also extended for aggregations along hierarchies. In accordance with the invention, execution of multiple GROUP-BYs is combined in order to avoid redundant work.

An Exemplary Data Cube for a Query

Initially, consider an aggregation problem in which there are four attributes, arbitrarily designated A, B, C, and D. The cube operator, applied to this aggregation problem, is shown schematically in FIG. 2. The cube operator is preferably implemented in software as a data structure, stored in memory. The schematic representation of FIG. 2 is more specifically referred to as a search lattice.

A search lattice for a data cube is a graph, wherein (i) a vertex represents a GROUP-BY of the cube, and (ii) a directed edge connects GROUP-BY i to GROUP-BY j whenever j can be generated from i, and j has exactly one attribute less than i.

FIG. 2, in addition to being a general illustration of a data cube, is also, more particularly, an example of a search lattice as per this definition. Level k of the search lattice denotes all GROUP-BYs that contain exactly k attributes. The keyword "all" is used to denote the empty GROUP-BY. The term "parent of a GROUP-BY g" is used to denote the GROUP-BY that can generate the GROUP-BY g.

Each edge in the search lattice is designated $e_{ij}$, and has two weights. The first weight $S(e_{ij})$ is the cost of computing j from i when i is not already sorted. The second weight $A(e_{ij})$ is the cost of computing j from i when i is already sorted.

The search lattice for the cube operator illustrates the number of possibilities that exist for computing a GROUP-BY. Each possible GROUP-BY is represented as a string of one or more of the letters A, B, C, and D, representing which of the attributes are used in that GROUP-BY. In the unique case at the top, in which all attributes are taken together, the word "all" is used to represent the GROUP-BY.

However, many of the conclusions presented in connection with this preferred embodiment of the invention also hold for the more general case of the computation of aggregates of a subset of all possible combination of attributes. The cube-operator algorithms are also appropriately extended for this purpose.

In typical OLAP applications, attributes have hierarchies defined on them. For instance, a PRODUCT→TYPE→category is a hierarchy on PRODUCT that specifies various aggregation levels for products.

For instance, "ivory" and "irish spring" both are of type "soap." The type "soap" and another type "shampoo" both are in the broader category "personal hygiene" products.

Further in accordance with the invention, a hierarchy is included, as part of the search lattice, for indicating parent-child relationships between the GROUP-BYs. First, the GROUP-BYs are given in levels or rows, vertically displaced above or below each other. Within each row, the GROUP-BYs all have the same number of attributes specified. For each successive row (in the example shown, for each downwardly successive row), the number of specified attributes increases by one.

Further, the hierarchical relationships are shown as edges running between various pairs of GROUP-BYs. That is, for each edge shown between two combinations of attributes at different levels of the search lattice, it is possible to perform a GROUP-BY for the combination of attributes on the upper level, based on the results of the GROUP-BY operation for the combination of attributes on the lower level.

For the sake of simplicity, FIG. 2 shows edges only between adjacent levels of the cube. However, it will be understood that edges between non-adjacent levels may also be shown in such a search lattice, and that it would be likewise possible to perform a GROUP-BY for the combination of attributes on the non-adjacent upper level, based on the results of the GROUP-BY operation for the combination of attributes on the non-adjacent lower level. It is considered preferable to focus on the edges between adjacent levels, because the number of executions of a GROUP-BY from the results of a previously executed GROUP-BY, as will be discussed, tends to be maximized for executions base on the results of executions from adjacent levels.

Summary of Computation Methods and Optimizations

There are two basic methods for computing a GROUP-BY: (1) the sort-based method and (2) the hash-based method. In accordance with the invention, these methods are adapted to handle the cube query by incorporating the following three optimizations, which have been referred to above:

Smallest-parent: This optimization aims at computing a GROUP-BY from the smallest previously computed GROUP-BY, rather than from the raw data every time. It is assumed that the aggregating functions are decomposable, that is, they allow the input set to be partitioned into disjoint sets that can be aggregated separately and later combined. In general, for a given GROUP-BY, there are a number of pre-computed GROUP-BYs from which the given GROUP-BY can be computed. These previously computed GROUP-BYs may be observed in FIG. 2, as rows (if any) below the row in which a given GROUP-BY is located.

Cache-results: This optimization aims at caching (in memory) the results of a GROUP-BY from which other GROUP-BYs are computed, so as to reduce I/O on disk. For instance, for the cube in FIG. 2, after ABC is computed and the results are cached in memory, AB may be computed from the results of the ABC computation, while those results are still in memory.

Amortize-scans: This optimization aims at amortizing the cost of reading disk by computing as many GROUP-BYs as possible together in memory. For instance, if the results of the computation of the GROUP-BY ABCD are stored on disk, the disk read costs may advantageously be reduced if all of ABC, ACD, ABD, and BCD were computed in one scan of ABCD.

For OLAP databases, the size of the data to be aggregated is usually much larger than the available main memory. Under such constraints, the above three optimizations are often contradictory. For instance, for computing B, the first optimization will favor BC over AB if BC is smaller, but the second optimization will favor AB if it is in memory while BC is on disk.

There are additional optimizations that are specific to the sort-based and hash-based routines. For instance, for the sort-based method, time spent on external sorts can be reduced by using data sorted in a particular order to compute multiple GROUP-BYs. For the hash-based method, when the hash-table is too large to fit in memory, data is partitioned and the aggregation is done for each partition that fits in memory. Data partitioning cost is saved by sharing this cost across multiple GROUP-BYs.

In general, the more detailed implementations of the steps shown in the flowchart of FIG. 1 will be given in the form of pseudocode, presented directly in the text of the present specification.

Sort-Based Methods

In this section, there is a description of sort-based algorithms which implement FIG. 1 using the three optimizations listed above, and an additional optimization that combines external sorts across multiple GROUP-BYs.

Savings are realized on external sorting cost, in accordance with the invention, by using data sorted in a particular order to compute all GROUP-BYs that are prefixes of that order.

For instance, data sorted on attribute order ABCD can be used to compute GROUP-BYs ABCD, ABC, AB and A without additional sorts. The optimization "smallest-parent" (discussed above) that computes each GROUP-BY from the smallest pre-computed GROUP-BY could conflict with the objectives of reducing sorts. In accordance with the invention, an algorithm is presented that combines these two optimizations to get a minimum total cost.

The algorithm also incorporates the other two optimizations, "cache-results" and "amortize-scans" (designed to reduce disk scan cost) by executing multiple GROUP-BYs in a pipelined fashion. Each pipeline is a list of GROUP-BYs, all of which can be computed in a pipelined fashion in a single scan of the parent GROUP-BY. Therefore, this computation requires a single sort of the parent data.

An example of such a pipeline is given by the expression $$ABCD \to ABC \to AB \to A$$

The pipeline represented by this expression is executed as follows: First, the raw data is sorted for the attribute order ABCD, and then the sorted data is scanned to compute a GROUP-BY ABCD. Every time a tuple of ABCD has been computed, it is propagated up to compute ABC; every time a tuple of ABC is computed, it is propagated up to compute A; and so on. During the course of execution of a pipeline, it is only necessary to keep one tuple per GROUP-BY in memory.

Detailed algorithms for sort-based implementations of FIG. 1, particularly steps 6 and 8, will now be presented and compared.

Single Sort

First, a naive method of reducing the number of sorts by exploiting common prefixes is presented. This method, called Single sort, computes a single GROUP-BY at a time. For each GROUP-BY g, the current list of sorted orders is examined. If g is a prefix of some sorted order h, then h is used for computing g. Otherwise, the smallest parent GROUP-BY is re-sorted according to the order of the attributes in g.

This method is not optimal, even in terms of the number of sorts. For instance, if this method is used for a three attribute cube, ABC, then four sorts are used: first, the raw data on ABC is sorted, and ABC, AB and A are computed; then, BC is sorted and BC and B are computed; then, AC is sorted and AC is computed; and finally C is sorted and C is computed.

However, further optimization makes it possible to complete the computation with only three sorts (by sorting on CA instead of AC).

PipeSort

There will now be presented a preferred algorithm, designated by the name "PipeSort", which finds a plan for computing all GROUP-BYs in the minimum total cost in the sense discussed below. It is assumed that, for each GROUP-BY, an estimate is available of the number of distinct values. How these estimates are made will be discussed below. The input to the algorithm is the search lattice, described above in connection with FIG. 2.

The output of the algorithm PipeSort is a subset of the search lattice. In the output search lattice, each GROUP-BY is associated with the order in which the GROUP-BY will be computed. Also, each GROUP-BY is connected to a parent GROUP-BY by an edge that is either marked S or A depending on whether or not a re-sorting is required.

The algorithm proceeds level-by-level, starting from level k=N, where N is the total number of attributes. For each level k, the algorithm PipeSort determines the cheapest way of computing level k from level k+1.

The cost of computing level k from k+1 is determined as follows: if, from a GROUP-BY g in level k+1, n GROUP-BYs are generated, then the first GROUP-BY will incur only the aggregation cost A( ), whereas all the other GROUP-BYs will incur the higher cost S( ) that requires re-sorting. The first of the n GROUP-BYs generated from g uses the order in which g is computed, and thus the first sorting order comes for free, as far as level k is concerned. For the remaining n−1 GROUP-BYs, g needs to be re-sorted separately for each GROUP-BY, and hence also incurs the sorting cost. The algorithm below finds the cheapest way to generate GROUP-BYs in level k with this cost function.

The algorithm is based on a reduction to the weighted bipartite matching problem. Each vertex in level k+1 is replicated k+1 times (note that k+1 is the out-degree of any level-k vertex in the search lattice.) Each replicated vertex is connected to the same set of vertices as the original vertex.

The weight on an edge e from the original vertex is A(e), whereas for all replicated vertices the edge weight is S(e). The minimum matching weight is found in the bipartite graph induced by this transformed graph. A preferred algorithm for finding the minimum weight matching in a bipartite graph may be found in Papadimitriou et al., Combinatorial Optimization: Algorithms and Complexity, Chapter 11, pp. 247–254 (1982).

The complexity of this algorithm is $O(((k+1)M_{k+1})^3)$, where $M_{k+1}$ is the number of GROUP-BYs in level k+1. In most cases, an approximate solution can be good enough. For instance, in the procedure "Generate-Plan-Greedy" which will be described below, a simple greedy solution is given, which has a complexity $O((M_k)(M_{k+1}))$.

Two variations of the PipeSort algorithm will now be presented. The two variations differ in the use of two different versions of the "Generate-Plan" procedure, called from the basic PipeSort Algorithm (presented first). The variation of the PipeSort algorithm that uses Generate-Plan-Optimal is referred to as PipeSortOpt. Likewise, the variation of the PipeSort algorithm that uses Generate-Plan-Greedy is referred to as PipeSortGreedy.

There will now be presented exemplary pseudocode implementations of the basic PipeSort algorithm, which includes a call to a subroutine GeneratePlan. Two different implementations of GeneratePlan algorithms are given, which, when used in PipeSort, produce the two variations PipeSortOpt and PipeSortGreedy, respectively. Performance evaluations have indicated that PipeSortGreedy produces the best results in terms of execution efficiency.

PipeSort

```
/* Input: search lattice with the A( ) and S( ) edges' costs*/
For level k = 0 to N-1 /* N is the total number of attributes */
    /* determine how to generate level k from level k + 1 */
    GeneratePlan( );
/* fix the order in which GROUP-BYs are sorted */
For level k = 0 to N-1
    For each GROUP-BY g in level k + 1
        Fix the computing order of g as the order of the child of g that is connected by
            an A( ) edge.
```

Generate-Plan-Optimal

```
Replicate each level-(k + 1) vertex k + 1 times
The edge weight on edge e_ij from the original vertex is A(e_ij) and from the copy
    vertex is S(e_ij)
Find the minimum weight matching on the transformed level k + 1 with level k;
```

Generate-Plan-Greedy

```
For each GROUP-BY g in level k
match it to a GROUP-BY h in level k + 1 that is connected by the least cost edge to
    g, where cost of an edge is A( ) if the parent group-by h is not yet matched or
    else it is S( ).
```

Figure 3:
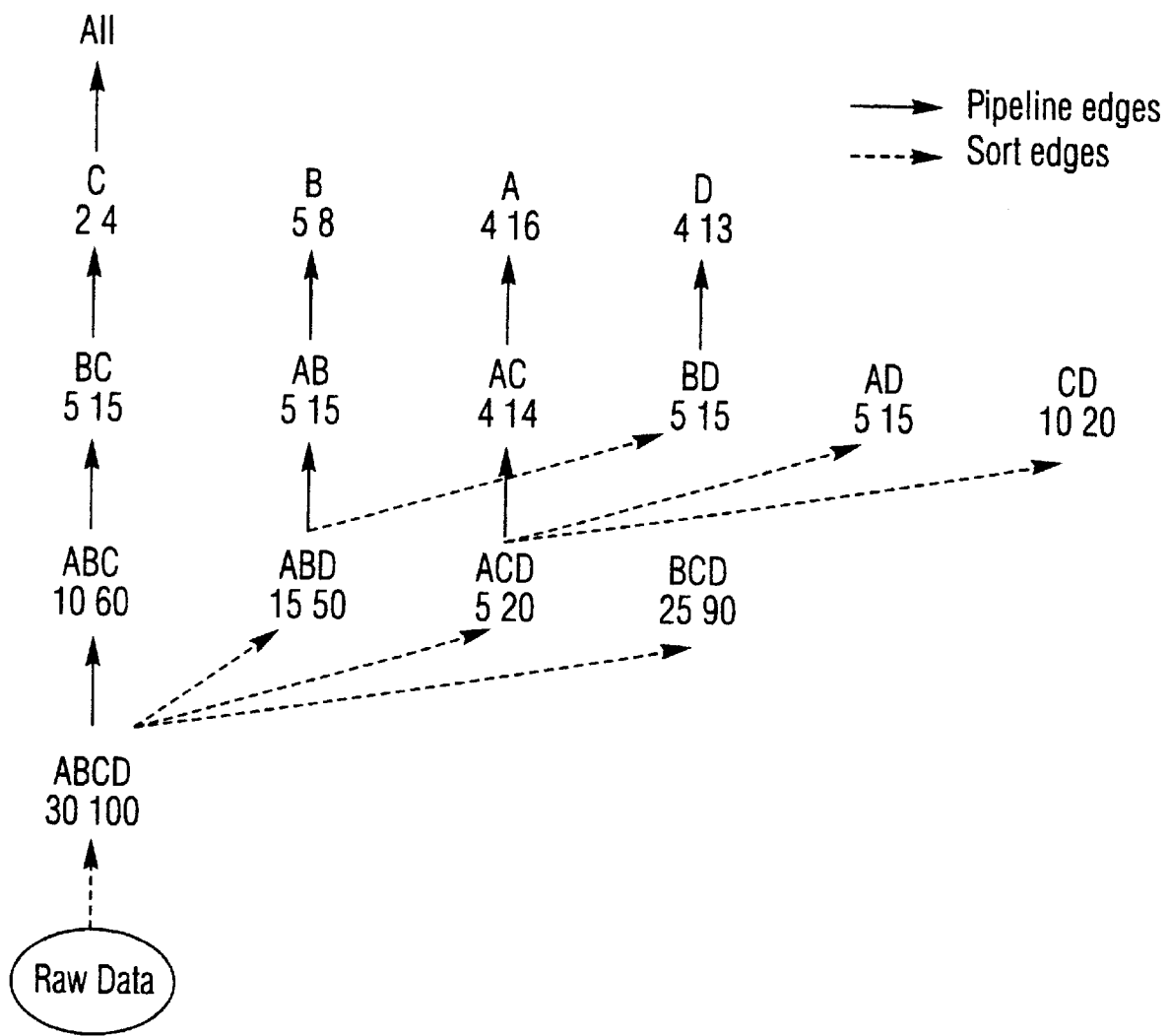
FIGS. 3 and 4 are schematic diagrams which illustrate the operation of a sort-based algorithm for implementing FIG. 1 on the operator of FIG. 2 in accordance with the invention.
Figure 4:
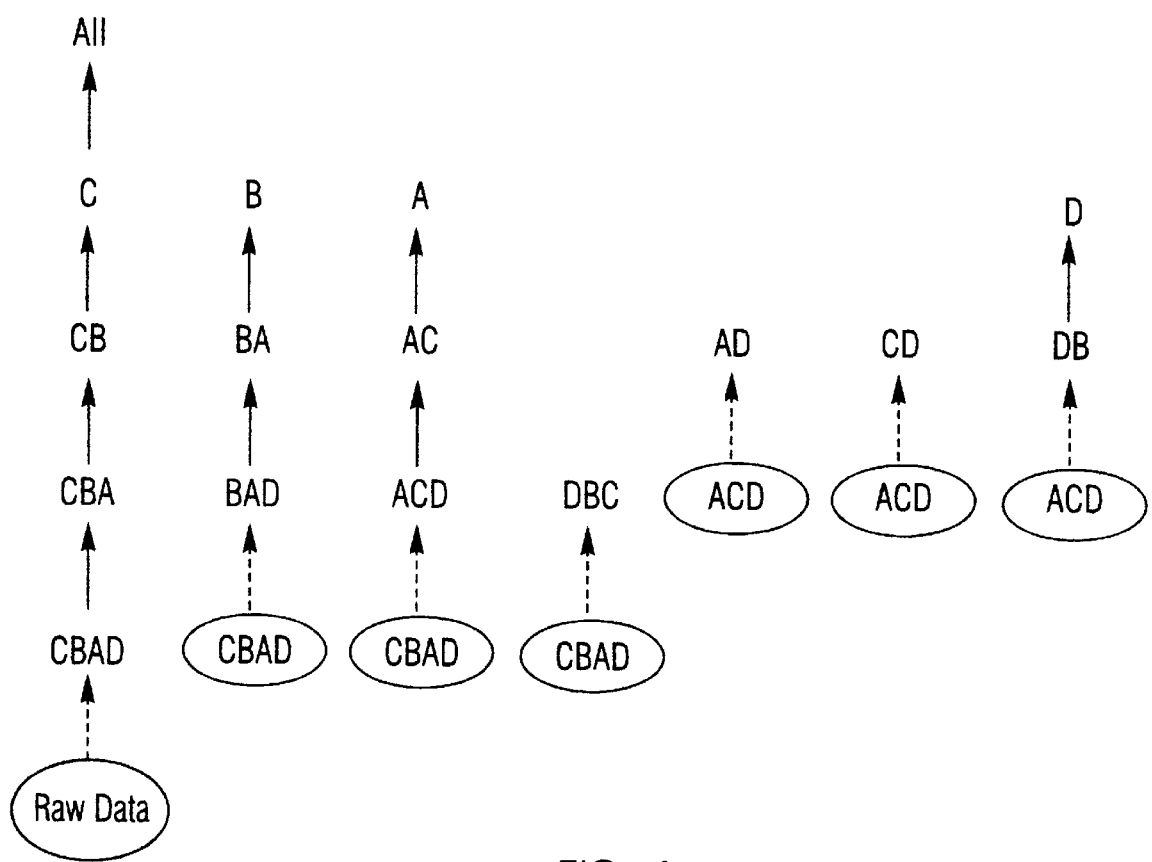

FIGS. 3 and 4 show an example plan generated by the PipeSort algorithm. FIG. 3 shows the sort plan for the four attribute lattice of FIG. 2. For the sake of clarity, it is assumed that, for a given GROUP-BY, the weights A( ) and S( ) are the same for all GROUP-BYs that it can generate. The pair of numbers underneath each GROUP-BY denotes the A( ) and S( ) weights for that respective GROUP-BY.

For these weights, the graph in FIG. 3 shows the minimum cost plan. Solid edges connect GROUP-BYs that can be computed from their parents without additional sorting. The dashed edges are to GROUP-BYs that require re-sorting of the parent.

Note that the above plan is optimal in terms of the total cost, although the total number of sorts is suboptimal. For most real-life datasets, there could be a big difference in the sizes of GROUP-BYs on a level. Hence, optimizing for the number of sorts could lead to very suboptimal plans.

FIG. 4 shows the pipelines that are executed from the plan of FIG. 3. This plan is executed by, first, sorting data in the order ACBD. In one scan of the sorted data, the GROUP-BYs CBAD, CBA, CB, C and all would be computed in a pipelined fashion. Then, the GROUP-BY ABCD would be resorted in the order BADC and BAD, the GROUP-BYs BA and B would be computed in a pipelined fashion, and so on.

When sorting data, the familiar techniques are employed, of aggregating and removing duplicates, as shown in Graefe, "Query Evaluation Techniques for Large Databases", ACM Computing Surveys, 25(2): 73–170, June 1993.

Often, the sorting cost can be reduced by taking advantage of the partial sorting order. For instance, in FIGS. 3 and 4, for sorting ACD in the attribute order AD, a sorted run of D is used for each distinct value of AC, and for each distinct A these runs of D are merged, to avoid repeating the run generation phase of sorting. It is easy to incorporate this into the cost modeling for the PipeSortGreedy method.

Proof Of Optimality Of PipeSortOpt

It can be proven that the algorithm PipeSortOpt provides the optimal plan for generating the data cube for the search lattice defined earlier.

The proof has two parts: First it is proven that the optimal solution for level k does not affect the optimality of other levels. Next, it is proven that the method for generating a level from its previous level is optimal.

The proof of the second of these parts is straightforward.

Proof of part 1 is as follows: After the way to generate level k from level k+1 is fixed, the only constraint on level k+1 is the order in which the GROUP-BYs should be generated. If some optimal solution for level k+1 through level N does not produce the GROUP-BYs in that order, the GROUP-BYs can be reordered in the order required by level k's solution without affecting the optimality of the final result.

Note that this proof applies only for the case where each GROUP-BY is generated only from one of the GROUP-BYs in the preceding level. There might be cases where generating a GROUP-BY from GROUP-BYs in levels more than one level away leads better solution. However, no such case is known.

Hash-Based Methods

Next, incorporation of the optimizations listed above into the hash-based methods for computing GROUP-BYs will be discussed.

For the hash-based method, incorporating the second and third optimizations (cache-results and amortize-scans) requires careful memory allocation of the hash-tables of multiple GROUP-BYs. For instance, the hash tables for GROUP-BYs AB and AC are kept in memory, and those two GROUP-BYs are computed in one scan of ABC. After AB is computed, the GROUP-BYs A and B are computed while AB is still in memory. Thus, the disk scan on AB is avoided.

If there were enough memory to hold the two largest consecutive levels of GROUP-BYs in the search lattice, all three optimizations could be added in as follows:
Algorithm LevelHash:
  Compute first GROUP-BY consisting of all N attributes from raw data;
  for k=N−1 to 0
  for each k+1 attribute GROUP-BY, g
    Compute in one scan of g all k attribute GROUP-BY for which g is the smallest parent;
    Save g to disk and free memory occupied by the hash table;

Very often, aggregation is performed over data much larger than that can be held in memory. Hence, it is unlikely that enough memory is available to cache two levels. The second option is then to compute each GROUP-BY separately, as follows:
Algorithm SingleHash:
  Compute first GROUP-BY consisting of all N attributes from raw data;
  for k=N−1 to 0
  for each k attribute GROUP-BY, g
    Compute g from the smallest k+1 attribute parent of g
    Save g to disk and free memory occupied by the hash table;

Optimization: Sharing Partitioning Cost Across Multiple GROUP-BYS

However, the available main memory may not be sufficient for even a single hash-table. The standard way to deal with limited memory when constructing hash tables is to partition the data on one or more attributes. When data is partitioned on some attribute, say an attribute designated A, then all GROUP-BYs that contain the attribute A in the attribute list can be computed independently on each partition of the data. The results across multiple partitions do not have to be combined. Thus, the cost of data partitioning can be shared across all GROUP-BYs that contain the partitioning attribute.

This adds a fourth optimization for hash-based algorithms: sharing the partitioning cost across multiple GROUP-BYs. The PipeHash algorithm, presented below, incorporates this optimization. The PipeHash algorithm also attempts to reduce disk scans (by use of the above-described optimizations cache-results and amortize-scans) and to compute each GROUP-BY from its smallest parent.

Summary of the PipeHash Algorithm

The input to the algorithm is the search lattice as described above in connection with FIG. 2. The PipeHash algorithm first chooses, for each GROUP-BY, the parent GROUP-BY with the smallest estimated total size. The outcome of this step is a minimum spanning tree (MST) where each vertex is a GROUP-BY, and an edge from a GROUP-BY a to a GROUP-BY b indicates that a is the smallest parent of b.

Next, subtrees of the MST are selected that can be computed together. The subtrees could possibly require data partitioning, in which case, all GROUP-BYs of the subtree must contain the partitioning attribute.

After a selected subtree is removed from the tree, a collection of subtrees are left. Hence, at any point of time, the algorithm maintains a forest of trees that need to be executed.

The base of each subtree contains the parent GROUP-BY used for computing the GROUP-BYs in the subtree. During computation of a subtree, first the parent GROUP-BY is partitioned (if necessary). The size of the partitions are chosen such that the whole subtree for each partition can be computed totally in memory. This implies that the available memory should be large enough to hold any two consecutive levels of the subtree for each data partition.

Next, the subtree is visited in a breadth-first manner and, for each node visited, all its children are computed in one scan of the node.

Detailed Discussion of PipeHash

A pseudo-code implementation of PipeHash appears below. For simplicity, the psuedo-code omits what happens when the system runs out of memory in the middle of the computation of a subtree because of data skew. When this happens, memory is released by freeing-up some hash-tables of cached GROUP-BYs. Note that no caching is done across partitions and across subtrees.

Within a subtree, hash-tables are chosen to be released in the following order:

1. completed hash-tables that will not be used for generating other GROUP-BYs;
2. completed hash-tables that will be used or are being used; and finally
3. incomplete hash-tables, if there are more than one being generated.
4. part of a hash-table if it is the only one being generated. When incomplete hash-tables or part of a hash-table is freed, the parent GROUP-BY will need to be re-scanned from disk to generate the remaining GROUP-BYs, or part of a GROUP-BY, as the case may be.

Figure 5:
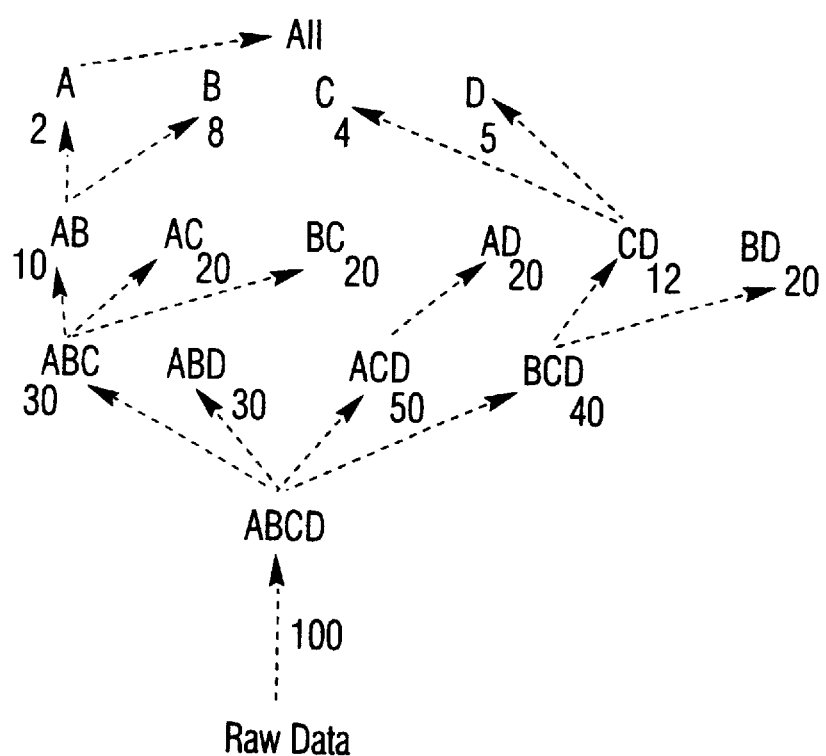
FIGS. 5, 6 and 7 are schematic diagrams which illustrate the operation of a hash-based algorithm for implementing FIG. 1 on the operator of FIG. 2 in accordance with the invention.

Pseudocode will now be given for implementing the PipeHash algorithm:

FIG. 5 shows the minimum spanning tree. Let us assume there is not enough memory to compute the whole tree in one pass. Hence the data must be partitioned.

Figure 6:
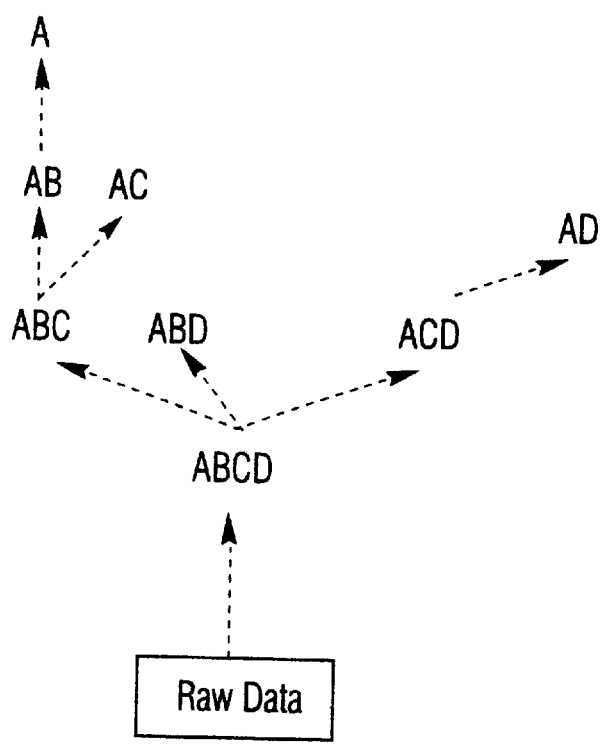

FIG. 6 shows the first subtree selected, when the attribute A is chosen as the partitioning attribute. First, the data on A is partitioned, and the GROUP-BYs in this subtree are executed.

Figure 7:
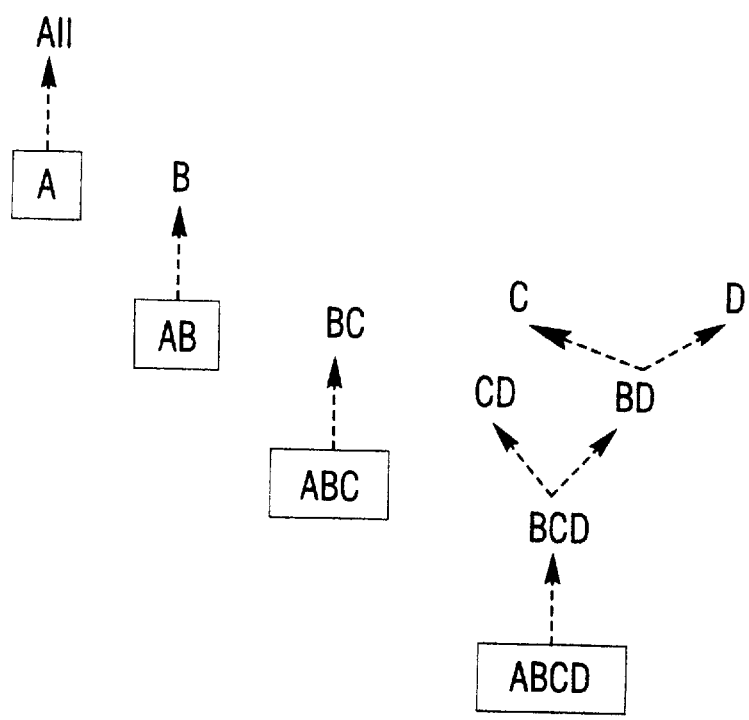

FIG. 7 shows the subtrees which remain after selection of the first subtree. Let us now assume that each of the remaining subtrees fit in memory. Hence, each of the remaining subtrees will be executed in one pass. The result, as discussed above, is that the PipeHash algorithm produces subtrees for which all GROUP-BYs can be executed from memory, without requiring interim accesses to disk.

Hashing Structures

There are two classes of hash tables, the two classes being based on whether collisions within a bucket are allowed.

The non-collision based hashing scheme reduces to a multidimensional array, if it is assumed that data attributes are mapped into contiguous unique integers during a prepass of the data.

For the collision based schemes, the hash function is the concatenation of the first $n_i$ bits for each attribute i of the tuple.

The term Hash-Grid will be used to refer to the collision based scheme, and the term Hash-Array to refer to the non-collision based scheme.

The Hash-Grid is expected to be better when the data distribution in the N-dimensional space of the attributes is sparse. The Hash-Array scheme will result in large numbers of empty cells when the attribute space is sparse. On the other hand, the Hash-Array scheme has smaller space overhead per hashed tuple. For the Hash-Array, only the aggregate values are stored for each tuple, since the attributes of

```
Algorithm PipeHash:
forest = MST(search lattice);
while (forest is not empty)
        T = first tree in forest;
                /* find the subtree of T to be executed next */
        T₀ = Select-subtree(T, forest);
                /* Compute the group-bys on subtree T₀*/
        numParts = (memory required by T₀)*(fudge_factor)/memory available;
        Partition root of T₀ into numParts;
        for I = 1 to numParts
                for each node in T₀(scanned in a breadth first manner)
                Compute all children of the node in one scan;
                Save node to disk and free memory occupied by its hash-table;
Select-subtree:
        for each possible subset s of attributes
        T_s = subtree of T covered by s;
        parts(s) = maximum number of partitions possible if root of T is partitioned on s;
        /* the root of the tree is the group-by from which the tree is computed */
        cover(T_s) = number of nodes in T_s;
        mem(T_s) = memory required for computing T_s;
        if (mem(T_s)/parts(s) > memory available)
        s is not a valid partition, go to next subset;
        T₀ = T_s if cover(T_s) is the maximum so far;
        forest = forest ∪ remaining subtrees after T₀ is removed from T;
        return T₀;
```

Example of PipeHash

FIGS. 5, 6, and 7 show the working of the PipeHash algorithm for the four attribute search lattice of FIG. 2. In FIG. 5, the numbers underneath each GROUP-BY give the size of the GROUP-BY. In FIG. 7, the circled GROUP-BYs represent the root of the subtrees.

the tuple can be uniquely determined by the indices of the hashed cell. In contrast, for the Hash-Grid, the entire tuple needs to be stored.

Methods for choosing between the collision and the non-collision based schemes will be given next.

Cost Estimation

Next, the size of each GROUP-BY is estimated. Based on the estimates, either sort or hash-based algorithms, and the Hash-Array and Hash-Grid schemes for hashing are chosen. Before a description of the estimation methods is given, the input format used will be described.

Input data format: There are two options: (1) treat each attribute string the way it appears in the raw data, and (2) map each attribute into unique integers through appropriate discretization methods.

The second option is preferred, because integer comparisons are faster than string comparisons, and the storage requirements for integers are smaller than strings. The disadvantage is the extra time for the conversion steps. The conversion can be done either on the fly or as a pre-pass, depending on whether there is extra disk space to store the converted data. When data is converted on the fly, a portion of the memory will be used up by the mapping table used for the conversion. This potentially deteriorates the performance of the aggregation.

Estimating the Size of a GROUP-BY

A number of statistical estimation procedures can be used for estimating the number of distinct values for each GROUP-BY. See, for instance, Haas et al., "Sampling-based Estimation of the Number of Distinct Values of an Attribute" Proceedings of the Eighth International Conference on Very Large Databases (VLDBs).

Alternely the data conversion phase is used to get some starting rough estimates, and to refine those estimates during the course of computation of the data cube. The starting estimates are made as follows: the number of distinct values for each attribute of the GROUP-BY is obtained from the data conversion step. Uniform-distribution is then assumed, to get the number of distinct values in a GROUP-BY as follows:

Let N be the number of grouping attributes, D be the number of tuples in the raw data, and $D_i$ be the number of distinct values for attribute I. For estimating the number of tuples for a GROUP-BY $A_1 A_2 \ldots A_k$ consisting of attributes 1 through k, the following formula is used:

$$|A_1 A_2 \ldots A_k| = \min(D_1 \times D_2 \times \ldots \times D_k; D)$$

The initial estimates obtained using the above method are refined in the following ways:

(1) Once some GROUP-BYs are computed, then it is established that the size of all GROUP-BYs that are derivable from the above formula will be strictly smaller.

(2) Once two levels have been covered, better estimates may be obtained as follows:

$$\frac{|ABCD|}{|ABC|} \leq \frac{|ABD|}{|AB|}$$

which is equivalent to the expression:

$$|AB| \leq \frac{|ABD||ABC|}{|ABCD|}$$

(3) When going from one partition to the next in the partitioned hashing scheme, estimates for subsequent passes can be refined. In the first pass, records are maintained of the number of tuples inserted ($I_1$) and the number of distinct tuples after aggregation ($N_1$). If $I_2$ is the number of tuples to be inserted in the second pass, then the estimated number of tuples after aggregation is $$N_2 = \frac{I_2 N_1}{N_1}$$

for the second pass.

The algorithms PipeHash and PipeSort can then use these revised estimates to change their decisions about which GROUP-BY should be generated from which, on the fly. For the sake of simplicity the amount of plan revising is limited. The PipeSortGreedy algorithm, before starting a pipeline, re-computes the cost of generating the pipeline from the parent GROUP-BYs of the previous layer, but does not change the selection of GROUP-BYs within a pipeline. Similarly, the PipeHash algorithm re-evaluates the parent GROUP-BY for generating the next sub-tree, but does not otherwise change the structure of the sub-tree.

Criteria for Choosing Between Methods

A discussion, appearing below, shows empirically that the performance of the cube algorithms using the above estimation procedure is quite close to the performance of an algorithm that has perfect estimates.

Choosing Between PipeHash and PipeSort

Once the number of tuples is known for each GROUP-BY, known parameters such as disk read cost, size of memory available M, time to compare strings, etc., may be used to estimate the time required to do basic operations such as sorting, hashing, data partitioning, etc. Then, the PipeHash and the PipeSort algorithms are applied, in order to get an estimate of the total time. The time to generate the execution plan is ignored, because it is relatively small.

Choosing Between Hash-Array and Hash-Grid

Consider a GROUP-BY $A_1 A_2 \ldots A_k$. Let $D_i$ be the number of distinct values along attribute I, and let M be the estimated number of tuples in the GROUP-BY. The memory required for the Hash-Array is $$M_a = \prod_{i=1}^{k} D_i \times sizeof(\text{array cell}) + M \times sizeof(\text{aggregate column})$$

whereas the memory required for the Hash-Grid (assuming a perfect hash function) is $$M_a = M \times sizeof(\text{hash bucket}) + M \times ((k \times sizeof(\text{attribute})) + sizeof(\text{aggregate column}))$$

Based on these estimates, the method with the smaller memory requirement is chosen. When memory is not a constraint, the Hash-Array method is preferable, since values need not be compared after hashing.

Extensions

Finally, certain extensions to the method of the invention will be presented.

Partial Cube

Very often the user might be interested in just some of the GROUP-BYs in a cube, instead of all of them. If these aggregates have intersecting attributes in the GROUP-BY list, the ideas developed for the cube algorithms may be used to improve the performance of any collection of aggregates.

Both hash-based and the sort-based algorithms can be extended to handle partial cube GROUP-BYs. The only change required is that GROUP-BYs that are not asked for are not generated. These methods may be further improved by generating intermediate GROUP-BYs not asked for. For instance, for a four attribute cube, even if a user is interested in only three GROUP-BYs ABC, ACD, BCD it might be faster to compute the GROUP-BY ABCD, and then compute the three desired GROUP-BYs from ABCD, rather than compute each one of them from the raw data.

Very often the user is interested in only some of the GROUP-BY combinations, instead of all possible combinations of attributes as in the data cube. The ideas developed for the cube algorithms may also be used to improve the performance of these computations. One type of extension is to apply the PipeSort and PipeHash algorithm on the search lattice consisting of only GROUP-BYs that need to computed.

However, more efficient computations can be achieved by generating intermediate GROUP-BYs, even if they are not in the original requested subset.

For instance, consider a four attribute cube, the attributes being designated A, B, C, and D. Even if a user is interested in only three GROUP-BYs ABC, ACD, BCD, it might be faster to first compute the GROUP-BY ABCD and then compute the three GROUP-BYs from ABCD, rather than compute each one of them from the raw data. Extensions to the hash and sort-based methods will consider such intermediate GROUP-BYs for computing a specified collection of GROUP-BYS.

Hash-Based Method

The input to the algorithm is (i) the search lattice G, modified to have edges between all GROUP-BY pairs (e; f ) where f can be generated from e, rather than just between GROUP-BYs in adjacent levels; (ii) cost w on each edge (e; f ) that denotes the cost of generating GROUP-BY f from e; and (iii) a subset Y of the GROUP-BYs in G that needs to be computed.

The task at hand is to find the minimal cost tree of G that includes at least all of the subset Y of GROUP-BYs and the starting raw data.

This problem is akin to the minimal Steiner tree problem, described in Garey et al., Computers and Intractability, pp. 208–209. It is shown in Garey et al. that the general Steiner tree problem is NP-complete. Further, Lin et al., Multicast communication in Multicomputer Networks, Proc, International Conference on Parallel Processing, pp. III-114–III-118 ((1990) shows that the general Steiner tree problem is NP-complete, in a manner applicable to the special case of a cube graph that represents a search lattice according to the invention. Hence, approximate methods are used for computing the minimal cost tree. There are a number of existing approximate methods for the Steiner tree problem. The preferred method is given in Smith et al., An $O(n^2)$ hueristic Algorithm for the directed Steiner minimal tree problem, Applied Mathematical Modelling, 4(5): 369–75, October 1980.

After the minimal cost tree of G is found, the PipeHash algorithm is used to compute the required GROUP-BYs. An illustration of the above scheme is given in FIGS. 8 and 9 for the Synthetic data set presented earlier. Assume the objective is to compute GROUP-BYs A, B and AC.

Figure 8:
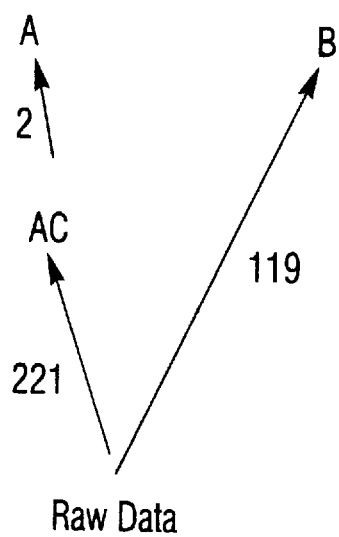
FIGS. 8 and 9 are schematic diagrams which illustrate the operation of a hash-based algorithm for implementing FIG. 1 on the operator of FIG. 2 in accordance with a first extension of the invention.

Referring first to FIG. 8, there is shown a search lattice not employing the method of the extension. The time required to compute the GROUP-BYs AC and B directly from raw data are each on the order of hundreds of seconds. Given the GROUP-BY AC, however, the GROUP-BY A can be computed in only 2 seconds.

Figure 9:
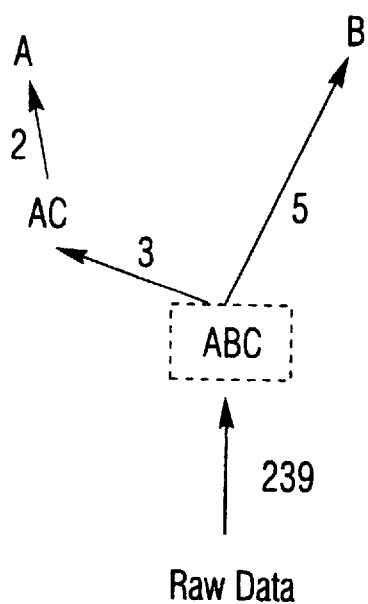

By contrast, FIG. 9 shows the search lattice which results when, in accordance with the above-discussed extension of the invention, the GROUP-BY ABC is computed as an intermediate step before computing the three desired GROUP-BYs. It will be seen that, once the intermediate GROUP-BY ABC is computed, all of the further computations, including the computation of all three of the desired GROUP-BYs, are expedited.

The best plan with the straightforward extension of the hashing method (FIG. 8) would take a total of 442 seconds. Using the Steiner tree method (FIG. 9), the addition of the extra node ABC results in a total cost of 249 seconds.

Sort-Based Method

The sort-based method does not directly adapt the solution of the hash-based method, since the cost of generating one GROUP-BY from another GROUP-BY g depends on the order in which g is sorted.

Hence, a different search lattice is constructed, in which, for each GROUP-BY g of level k, a total of k! sort-nodes are added. These added sort-nodes correspond to each possible permutation of the attributes of the already-calculated GROUP-BY g. The cost on an edge e from sort-node g to h denotes the cost of generating GROUP-BY sorted in order h from GROUP-BY sorted in order g. In addition, for each GROUP-BY g in set Y, a select-node is added, and each of the sort-nodes of g are joined by a zero-cost edge to this select-node. Then, the Steiner tree algorithm is applied to find the smallest tree including all the select-nodes and the raw data node.

The number of nodes in the search lattice using this method can be prohibitively large. However, a large number of nodes can easily be pruned. One pruning heuristic is to start from GROUP-BYs at level zero, and to prune sort-nodes level by level. For each level k, only those sort-nodes are included that (I) have some prefix at higher levels, and (ii) contain only attributes from sort-nodes of higher levels, except when the sort-node is of a GROUP-BY from set Y.

Figure 10:
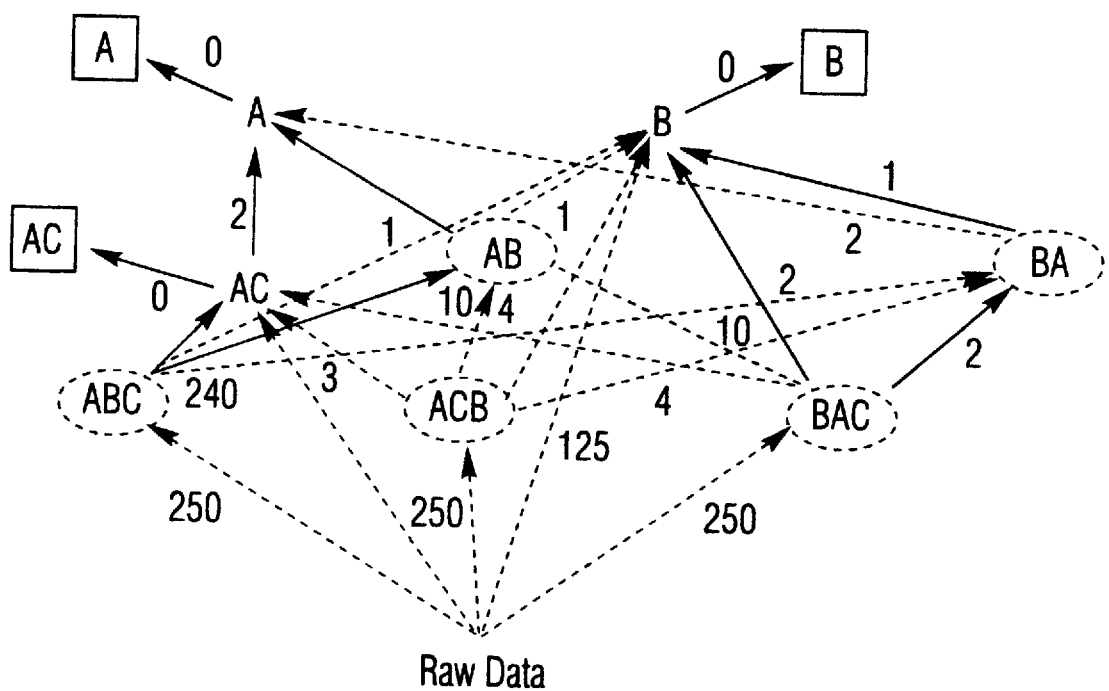
FIGS. 10 and 11 are schematic diagrams which illustrate the operation of a sort-based algorithm for implementing FIG. 1 on the operator of FIG. 2 in accordance with a second extension of the invention.
Figure 11:
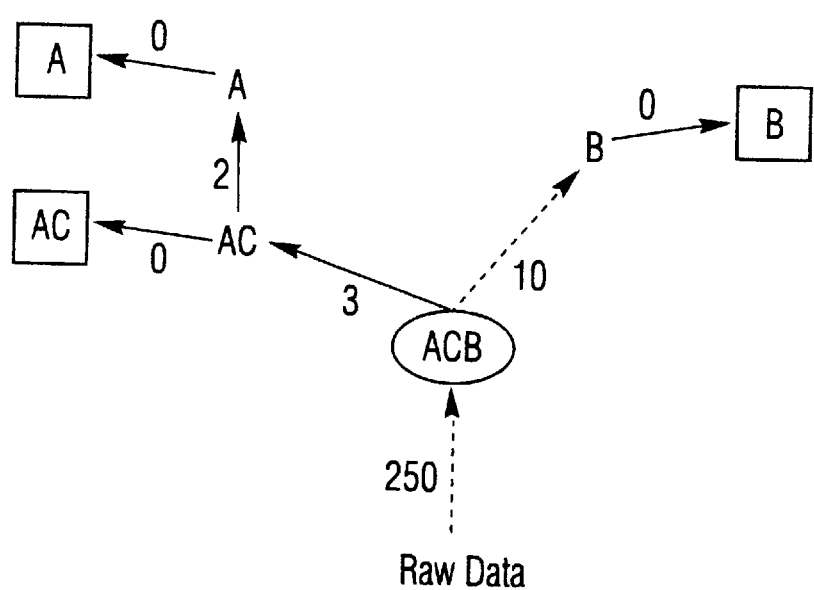

This pruning step is illustrated, in FIGS. 10 and 11, for the example of FIGS. 8 and 9. FIG. 10 shows the pruned search lattice for the set Y, which consists of A, B and AC. The select-nodes are within boxes, and the intermediate sort-nodes are within ellipses. The numbers on edges indicates the time taken to compute one GROUP-BY from another.

At level 2 (the second level above the raw data), there are three sort-nodes AC, AB and BA. The nodes that have been pruned, in accordance with this extension of the invention, are CA, CD, CB, DE and all other nodes which have neither A nor B as prefix and hence violate condition (i). The nodes BC, AD, BD and all other nodes containing attributes C, D or E were pruned, since they violate condition (ii). The only exception is the node AC, which belongs to the set Y.

Similarly, at level 3, we prune all sort-nodes except ABC, ACB and BAC.

The best plan after applying the Steiner tree algorithm on this search lattice is shown in FIG. 9. Again, it will be seen that, after the initial time investment is made to compute the node ACB, the remaining computations require little additional time. Thus, the sort-based method also provides advantageous time savings.

Hierarchies

The cube algorithms can easily be extended to handle attributes with hierarchies defined on them. The requirement, in this case, is to compute GROUP-BYs for each combination of attributes along each level of the hierarchy.

An example of a hierarchy was given above, in which "ivory" and "irish spring" were both examples of "soap", and "soap" and "shampoo" were both examples of "personal hygiene" products. Thus, "ivory" and "irish spring" are two examples of a high level of the hierarchy (i.e., high level of detail, designated with a superscript "1" in the example to be discussed below). "Soap" and "shampoo" are examples of a next lower level of the hierarchy (intermediate level of detail, superscript 2), and "personal hygiene" products are an example of a lowest level (low level of detail, superscript 3).

Thus, a query could include one GROUP-BY which groups another attribute with "ivory", and another GROUP-BY that groups the same other attribute with the more general "soap." In such a case, separate search lattice nodes are generated for the GROUP-BYs for which the same attribute has different hierarchical levels. Moreover, if several attributes have hierarchies, then a large number of GROUP-BYs may be requested, for different combinations of levels for the two attributes.

The cube algorithms developed so far need a search lattice of what GROUP-BY can be computed from what. A similar search lattice for the hierarchical case can be constructed as follows:

Start from the base level that contains just one GROUP-BY, where each attribute is at the lowest level of detail. From each GROUP-BY G, draw arcs to all other GROUP-BYs where exactly one of the attributes of G is at the next higher level of hierarchy.

Figure 12:
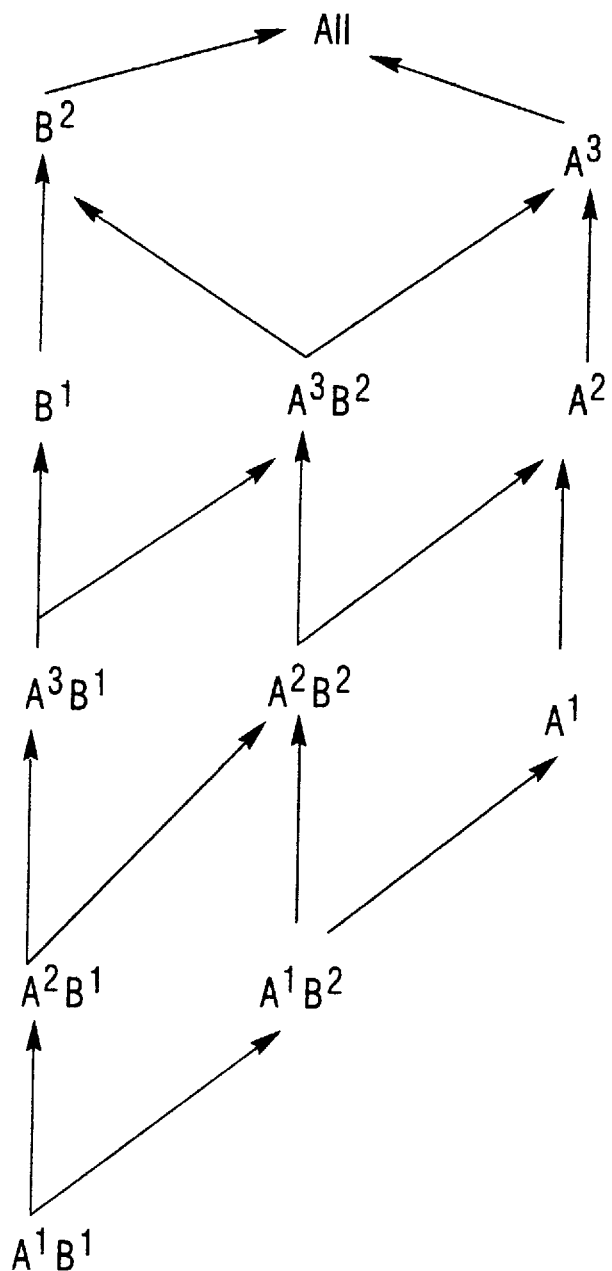
FIG. 12 is a graphical representation of a data cube operator in accordance with a third extension of the invention.

In FIG. 12, the search lattice is shown for two attributes A and B, with hierarchy $$A^1 \to A^2 \to A^3 \to all$$

on A and the hierarchy $$B^1 \to B^2 \to all$$

on B. The superscripts denote levels of the hierarchies, level 1 being the highest, the levels descending as the superscript values increase, until "all" is reached.

The PipeHash algorithms changes only in the way partitions are handled. When the partitioning attribute is $A^i$, GROUP-BY is performed on all attributes that contains any attributes below Ai in the hierarchy, i.e., $A^1 \ldots A^i$. For the sort-based algorithms, the sorting routines need to be modified so that when data is sorted on attribute $A^i$, it is sorted for all higher levels of the hierarchy i.e., $A^i \ldots$ all.

Summary

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, CPU, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A method, for execution by a database system, for performing GROUP-BY operations on a dataset of attributes, the method comprising the steps of:

generating an operator which represents (i) possible GROUP-BY operations on the dataset of attributes and (ii) hierarchies of the possible GROUP-BY operations, using a predetermined optimization technique;

computing a first GROUP-BY operation on a first subset of the dataset of attributes using the operator; and computing a second GROUP-BY operation on a second subset of the dataset of attributes using the operator, the second subset being a proper subset of the first subset, based on the results of the step of computing a first GROUP-BY operation on the first subset of the attributes.

2. A method as recited in claim 1, wherein the step of generating an operator includes generating a data cube operator.

3. A method as recited in claim 1, wherein:

the method further includes using the operator to identify, for a given one of possible GROUP-BY operations for the attributes of the relation, parent ones of the possible GROUP-BY operations from which the given GROUP-BY operation may be computed; and the step of computing a second GROUP-BY operation includes computing the second GROUP-BY operation based on the results of one of the parent ones of the possible GROUP-BY operations, identified for the second GROUP-BY operation in the step of identifying, which is smallest of the parent ones of the possible GROUP-BY operations.

4. A method as recited in claim 1, wherein the step of generating an operator includes using an optimization technique of:

computing a first GROUP-BY to produce results thereof;

storing the results of the first GROUP-BY in cache memory; and computing another GROUP-BY based on the results of the first GROUP-BY operation stored in cache memory by the step of storing.

5. A method as recited in claim 1, further comprising using an optimization technique of:
- computing a first GROUP-BY to produce results thereof;
- storing the results of the first GROUP-BY in disk storage;
- scanning the results of the first GROUP-BY in disk storage; and
- computing a plurality of other GROUP-BYs concurrently based on the scanned results of the first GROUP-BY.

6. A method as recited in claim 1, wherein the steps of computing first and second GROUP-BYs are performed using a sort-based method.

7. A method as recited in claim 6, further comprising the step of computing multiple GROUP-BYs using a single sort.

8. A method as recited in claim 7, wherein the step of computing multiple GROUP-BYs using a single sort includes computing the GROUP-BYs in a pipelined fashion.

9. A method as recited in claim 7, wherein the step of computing multiple GROUP-BYs using a single sort includes the steps of:
- identifying respective levels within the operator generated by the step of generating an operator, the levels having a hierarchy based on the number of attributes in each GROUP-BY in the levels; and
- determining, for each level having a successively smaller number of attributes per GROUP-BY, a lowest-cost way of computing the GROUP-BYs of that level, based on results of computations of GROUP-BYs for a previous level whose GROUP-BYs have one greater number of attributes, the step of determining being made based on a reduction to weighted bipartite patching.

10. A method as recited in claim 1, wherein the steps of computing first and second GROUP-BYs are performed using a hash-based method.

11. A method as recited in claim 10, further comprising the steps of:
- producing hash tables for multiple GROUP-BYs; and
- storing the hash tables in cache memory; and
- computing successive GROUP-BYs from the hash tables stored in cache memory.

12. A method as recited in claim 11, wherein the step of producing hash tables includes one of (i) employing a multidimensional array, and (ii) concatenating a predetermined number of bits for each attribute, based on how sparse is a distribution of data for the attributes.

13. A method as recited in claim 10, further comprising the steps of:
- partitioning based on an attribute; and
- computing multiple GROUP-BYs which include the attribute upon which the step of partitioning was based.

14. A method as recited in claim 13, wherein the step of partitioning is performed on a portion of the dataset.

15. A method as recited in claim 1, further comprising the steps of:
- estimating a size of a GROUP-BY; and
- selecting, based on the estimated size, whether the step of computing the GROUP-BY is to be done using a sort-based method or a hash-based method.

16. A method as recited in claim 1, further comprising the steps of:
- estimating a size of a GROUP-BY; and
- selecting, based on the estimated size, whether the step of computing the GROUP-BY is to be done using a hash-based method including producing hash tables by (I) employing a multidimensional array, and (ii) concatenating a predetermined number of bits for each attribute.

17. A method as recited in claim 1, further comprising the steps of:
- identifying respective levels within the operator generated by the step of generating an operator, the levels having a hierarchy based on the number of attributes in each GROUP-BY in the levels; and
- determining, for each level having a successively smaller number of attributes per GROUP-BY, a lowest-cost way of computing the GROUP-BYs of that level, based on results of computations of GROUP-BYs for a previous level whose GROUP-BYs have more than one greater number of attributes.

18. A method as recited in claim 1, wherein:
- the method is performed responsive to a received query which requests a subset of all possible GROUP-BY operations; and
- the step of generating an operator includes generating GROUP-BY operations based on whether the GROUP-BY operations are within the requested subset.

19. A method as recited in claim 18, wherein the step of generating GROUP-BY operations based on whether the GROUP-BY operations are within the requested subset includes:
- generating an intermediate GROUP-BY operation not included in the requested subset; and
- generating one of the requested GROUP-BY operations from the intermediate GROUP-BY operation.

20. A method as recited in claim 18, wherein the step of generating GROUP-BY operations based on whether the GROUP-BY operations are within the requested subset includes generating a minimal cost Steiner tree.

21. A method as recited in claim 18, wherein the step of generating GROUP-BY operations based on whether the GROUP-BY operations are within the requested subset is performed using a sort-based method.

22. A method as recited in claim 18, wherein the step of generating GROUP-BY operations based on whether the GROUP-BY operations are within the requested subset is performed using a hash-based method.

23. A method as recited in claim 1, wherein:
- one of the attributes of the dataset has a hierarchy of levels defined on it;
- the method is performed responsive to a received query which requests GROUP-BY operations in which different designated levels of the hierarchy for the attribute are requested; and
- the step of generating an operator includes using an optimization technique of identifying, for a given one of the GROUP-BY operations including a higher level of the hierarchy for the attribute having a hierarchy of levels, a parent one of the GROUP-BY operations which includes a lower level of the hierarchy for the attribute having a hierarchy of levels, from which the given GROUP-BY operation may be computed.

24. A database system, for performing GROUP-BY operations on a dataset of attributes, the system comprising:
- means for generating an operator which represents (i) possible GROUP-BY operations on the dataset of attributes and (ii) hierarchies of the possible GROUP-BY operations, using a predetermined optimization technique;
- means for computing a first GROUP-BY operation on a first subset of the dataset of attributes using the operator; and
- means for computing a second GROUP-BY operation on a second subset of the dataset of attributes using the operator, the second subset being a proper subset of the first subset, based on the results of the means for computing a first GROUP-BY operation on the first subset of the attributes.

25. A system as recited in claim 24, wherein the means for generating an operator includes means for generating a data cube operator.

26. A system as recited in claim 24, wherein:

the system further includes means for using the operator to identify, for a given one of possible GROUP-BY operations for the attributes of the relation, parent ones of the possible GROUP-BY operations from which the given GROUP-BY operation may be computed; and the means for computing a second GROUP-BY operation includes means for computing the second GROUP-BY operation based on the results of one of the parent ones of the possible GROUP-BY operations, identified for the second GROUP-BY operation by the means for identifying, which is smallest of the parent ones of the possible GROUP-BY operations.

27. A system as recited in claim 24, wherein the means for generating an operator includes means for using an optimization technique of:

computing a first GROUP-BY to produce results thereof;

storing the results of the first GROUP-BY in cache memory; and computing another GROUP-BY based on the results of the first GROUP-BY operation stored in cache memory by the step of storing.

28. A system as recited in claim 24, further comprising means for using an optimization technique of:

computing a first GROUP-BY to produce results thereof;

storing the results of the first GROUP-BY in disk storage;

scanning the results of the first GROUP-BY in disk storage; and computing a plurality of other GROUP-BYs concurrently based on the scanned results of the first GROUP-BY.

29. A system as recited in claim 24, wherein the means for computing first and second GROUP-BYs include means for using a sort-based method.

30. A system as recited in claim 29, further comprising the means for computing multiple GROUP-BYs using a single sort.

31. A system as recited in claim 30, wherein the means for computing multiple GROUP-BYs using a single sort includes means for computing the GROUP-BY s in a pipelined fashion.

32. A system as recited in claim 30, wherein the means for computing multiple GROUP-BYs using a single sort includes:

means for identifying respective levels within the operator generated by the means for generating an operator, the levels having a hierarchy based on the number of attributes in each GROUP-BY in the levels; and means for determining, for each level having a successively smaller number of attributes per GROUP-BY, a lowest-cost way of computing the GROUP-BYs of that level, based on results of computations of GROUP-BYs for a previous level whose GROUP-BYs have one greater number of attributes, the means for determining being made based on a reduction to weighted bipartite patching.

33. A system as recited in claim 24, wherein the means for computing first and second GROUP-BYs include means for using a hash-based method.

34. A system as recited in claim 33, further comprising:

means for producing hash tables for multiple GROUP-BYs; and means for storing the hash tables in cache memory; and means for computing successive GROUP-BYs from the hash tables stored in cache memory.

35. A system as recited in claim 34, wherein the means for producing hash tables includes means for one of (i) employing a multidimensional array, and (ii) concatenating a predetermined number of bits for each attribute, based on how sparse is a distribution of data for the attributes.

36. A system as recited in claim 33, further comprising:

means for partitioning based on an attribute; and means for computing multiple GROUP-BYs which include the attribute upon which the means for of partitioning was based.

37. A system as recited in claim 36, wherein the means for partitioning operates on a portion of the dataset.

38. A system as recited in claim 24, further comprising:

means for estimating a size of a GROUP-BY; and means for selecting, based on the estimated size, whether the means for computing the GROUP-BY is to operate using a sort-based method or a hash-based method.

39. A system as recited in claim 24, further comprising:

means for estimating a size of a GROUP-BY; and means for selecting, based on the estimated size, whether the means for computing the GROUP-BY is to operate using a hash-based method including producing hash tables by (I) employing a multidimensional array, and (ii) concatenating a predetermined number of bits for each attribute.

40. A system as recited in claim 24, further comprising:

means for identifying respective levels within the operator generated by the means for generating an operator, the levels having a hierarchy based on the number of attributes in each GROUP-BY in the levels; and means for determining, for each level having a successively smaller number of attributes per GROUP-BY, a lowest-cost way of computing the GROUP-BYs of that level, based on results of computations of GROUP-BYs for a previous level whose GROUP-BYs have more than one greater number of attributes.

41. A system as recited in claim 24, wherein:

the system is operative responsive to a received query which requests a subset of all possible GROUP-BY operations; and the means for generating an operator includes means for generating GROUP-BY operations based on whether the GROUP-BY operations are within the requested subset.

42. A system as recited in claim 41, wherein the means for generating GROUP-BY operations based on whether the GROUP-BY operations are within the requested subset includes:

means for generating an intermediate GROUP-BY operation not included in the requested subset; and means for generating one of the requested GROUP-BY operations from the intermediate GROUP-BY operation.

43. A system as recited in claim 41, wherein the means for generating GROUP-BY operations based on whether the GROUP-BY operations are within the requested subset includes generating a minimal cost Steiner tree.

44. A system as recited in claim 41, wherein the means for generating GROUP-BY operations based on whether the GROUP-BY operations are within the requested subset is performed using a sort-based method.

45. A system as recited in claim 41, wherein the means for generating GROUP-BY operations based on whether the GROUP-BY operations are within the requested subset is performed using a hash-based method.

46. A system as recited in claim 24, wherein:

one of the attributes of the dataset has a hierarchy of levels defined on it;

the system is operative responsive to a received query which requests GROUP-BY operations in which different designated levels of the hierarchy for the attribute are requested; and the means for generating an operator includes means for using an optimization technique of identifying, for a given one of the GROUP-BY operations including a higher level of the hierarchy for the attribute having a hierarchy of levels, a parent one of the GROUP-BY operations which includes a lower level of the hierarchy for the attribute having a hierarchy of levels, from which the given GROUP-BY operation may be computed.

47. A computer program product, for use with a database and processing system, for directing the system to perform GROUP-BY operations on a dataset of attributes, the computer program product comprising:

a computer readable medium;

means, provided on the computer-readable medium, for directing the database and processing system to generate an operator which represents (i) possible GROUP-BY operations on the dataset of attributes and (ii) hierarchies of the possible GROUP-BY operations, using a predetermined optimization technique;

means, provided on the computer-readable medium, for directing the database and processing system to compute a first GROUP-BY operation on a first subset of the dataset of attributes using the operator; and means, provided on the computer-readable medium, for directing the database and processing system to compute a second GROUP-BY operation on a second subset of the dataset of attributes using the operator, the second subset being a proper subset of the first subset, based on the results of the means for directing to compute a first GROUP-BY operation on the first subset of the attributes.

48. A computer program product as recited in claim 47, wherein the means for directing to generate an operator includes means, provided on the computer-readable medium, for directing the database and processing system to generate a data cube operator.

49. A computer program product as recited in claim 47, wherein:

the method CPP further includes means, provided on the computer-readable medium, for directing the database and processing system to use the operator to identify, for a given one of possible GROUP-BY operations for the attributes of the relation, parent ones of the possible GROUP-BY operations from which the given GROUP-BY operation may be computed; and the means for directing to compute a second GROUP-BY operation includes means, provided on the computer-readable medium, for directing the database and processing system to computing the second GROUP-BY operation based on the results of one of the parent ones of the possible GROUP-BY operations, identified for the second GROUP-BY operation by the means for directing to identify, which is smallest of the parent ones of the possible GROUP-BY operations.

50. A computer program product as recited in claim 47, wherein the means for directing to generate an operator includes means, provided on the computer-readable medium, for directing the database and processing system to use an optimization technique of:

computing a first GROUP-BY to produce results thereof;

storing the results of the first GROUP-BY in cache memory; and computing another GROUP-BY based on the results of the first GROUP-BY operation stored in cache memory by the step of storing.

51. A computer program product as recited in claim 47, further comprising means, provided on the computer-readable medium, for directing the database and processing system to use an optimization technique of:

computing a first GROUP-BY to produce results thereof;

storing the results of the first GROUP-BY in disk storage;

scanning the results of the first GROUP-BY in disk storage; and computing a plurality of other GROUP-BYs concurrently based on the scanned results of the first GROUP-BY.

52. A computer program product as recited in claim 47, wherein the means for directing to compute first and second GROUP-BYs include means, provided on the computer-readable medium, for directing the database and processing system to use a sort-based method.

53. A computer program product as recited in claim 52, further comprising the means, provided on the computer-readable medium, for directing the database and processing system to compute multiple GROUP-BYs using a single sort.

54. A computer program product as recited in claim 53, wherein the means for directing to compute multiple GROUP-BYs using a single sort includes means, provided on the computer-readable medium, for directing the database and processing system to compute the GROUP-BYs in a pipelined fashion.

55. A computer program product as recited in claim 53, wherein the means for directing to compute multiple GROUP-BYs using a single sort includes:

means, provided on the computer-readable medium, for directing the database and processing system to identify respective levels within the operator generated by the means for directing to generate an operator, the levels having a hierarchy based on the number of attributes in each GROUP-BY in the levels; and means, provided on the computer-readable medium, for directing the database and processing system to determine, for each level having a successively smaller number of attributes per GROUP-BY, a lowest-cost way of computing the GROUP-BYs of that level, based on results of computations of GROUP-BYs for a previous level whose GROUP-BYs have one greater number of attributes, the means for directing to determine being made based on a reduction to weighted bipartite patching.

56. A computer program product as recited in claim 47, wherein the means for directing to compute first and second GROUP-BYs include means, provided on the computer-readable medium, for directing the database and processing system to use a hash-based method.

57. A computer program product as recited in claim 56, further comprising:

means, provided on the computer-readable medium, for directing the database and processing system to producing hash tables for multiple GROUP-BYs; and means, provided on the computer-readable medium, for directing the database and processing system to storing the hash tables in cache memory; and means, provided on the computer-readable medium, for directing the database and processing system to computing successive GROUP-BYs from the hash tables stored in cache memory.

58. A computer program product as recited in claim 57, wherein the means for directing to produce hash tables includes means, provided on the computer-readable medium, for directing the database and processing system to perform one of (I) employ a multidimensional array, and (ii) concatenate a predetermined number of bits for each attribute, based on how sparse is a distribution of data for the attributes.

59. A computer program product as recited in claim 56, further comprising:

means, provided on the computer-readable medium, for directing the database and processing system to partition based on an attribute; and means, provided on the computer-readable medium, for directing the database and processing system to compute multiple GROUP-BYs which include the attribute upon which the step of partitioning was based.

60. A computer program product as recited in claim 59, wherein the means for directing to partition operates on a portion of the dataset.

61. A computer program product as recited in claim 47, further comprising the steps of:

means, provided on the computer-readable medium, for directing the database and processing system to estimate a size of a GROUP-BY; and means, provided on the computer-readable medium, for directing the database and processing system to select, based on the estimated size, whether the means for directing to compute the GROUP-BY is operable using a sort-based method or a hash-based method.

62. A computer program product as recited in claim 47, further comprising:

means, provided on the computer-readable medium, for directing the database and processing system to estimate a size of a GROUP-BY; and means, provided on the computer-readable medium, for directing the database and processing system to select, based on the estimated size, whether the means for directing to compute the GROUP-BY is operable using a hash-based method including producing hash tables by (I) employing a multidimensional array, and (ii) concatenating a predetermined number of bits for each attribute.

63. A computer program product as recited in claim 47, further comprising:

means, provided on the computer-readable medium, for directing the database and processing system to identify respective levels within the operator generated by the means for directing to generate an operator, the levels having a hierarchy based on the number of attributes in each GROUP-BY in the levels; and means, provided on the computer-readable medium, for directing the database and processing system to determine, for each level having a successively smaller number of attributes per GROUP-BY, a lowest-cost way of computing the GROUP-BYs of that level, based on results of computations of GROUP-BYs for a previous level whose GROUP-BYs have more than one greater number of attributes.

64. A computer program product as recited in claim 47, wherein:

the computer program product is operable responsive to a received query which requests a subset of all possible GROUP-BY operations; and the means for directing to generating an operator includes means, provided on the computer-readable medium, for directing the database and processing system to generate GROUP-BY operations based on whether the GROUP-BY operations are within the requested subset.

65. A computer program product as recited in claim 64, wherein the means for directing to generate GROUP-BY operations based on whether the GROUP-BY operations are within the requested subset includes:

means, provided on the computer-readable medium, for directing the database and processing system to generate an intermediate GROUP-BY operation not included in the requested subset; and means, provided on the computer-readable medium, for directing the database and processing system to generate one of the requested GROUP-BY operations from the intermediate GROUP-BY operation.

66. A computer program product as recited in claim 64, wherein the means for directing to generate GROUP-BY operations based on whether the GROUP-BY operations are within the requested subset includes generating a minimal cost Steiner tree.

67. A computer program product as recited in claim 64, wherein the means for directing to generate GROUP-BY operations based on whether the GROUP-BY operations are within the requested subset is performed using a sort-based method.

68. A computer program product as recited in claim 64, wherein the means for directing to generate GROUP-BY operations based on whether the GROUP-BY operations are within the requested subset is performed using a hash-based method.

69. A computer program product as recited in claim 47, wherein:

one of the attributes of the dataset has a hierarchy of levels defined on it;

the computer program product is operative responsive to a received query which requests GROUP-BY operations in which different designated levels of the hierarchy for the attribute are requested; and the means for directing to generate an operator includes means, provided on the computer-readable medium, for directing the database and processing system to use an optimization technique of identifying, for a given one of the GROUP-BY operations including a higher level of the hierarchy for the attribute having a hierarchy of levels, a parent one of the GROUP-BY operations which includes a lower level of the hierarchy for the attribute having a hierarchy of levels, from which the given GROUP-BY operation may be computed.

* * * * *